(12) United States Patent  
Finkenrath et al.

(10) Patent No.: US 8,341,964 B2
(45) Date of Patent: Jan. 1, 2013

(54) SYSTEM AND METHOD OF USING A COMPRESSED AIR STORAGE SYSTEM WITH A GAS TURBINE

(75) Inventors: Matthias Finkenrath, Garching b. Munich (DE); Balachandar Naidu, Loveland, OH (US); Charles Michael Booth, Norcross, GA (US); Garland Ferguson, Houston, TX (US); Stephanie Marie-Noelle Hoffmann, Munich (DE); Sebastian W. Freund, Unterföhring (DE)

(73) Assignee: General Electric Company, Niskayuna, NY (US)

( * ) Notice: Subject to any disclaimer, the term of this patent is extended or adjusted under 35 U.S.C. 154(b) by 402 days.

(21) Appl. No.: 12/606,761

(22) Filed: Oct. 27, 2009

(65) Prior Publication Data

US 2011/0094236 A1   Apr. 28, 2011

(51) Int. Cl.
*F02C 1/00* (2006.01)
(52) U.S. Cl. ............................................ 60/772; 60/727
(58) Field of Classification Search .................... 60/266, 60/726–728, 792, 772
See application file for complete search history.

(56) References Cited

U.S. PATENT DOCUMENTS

| | | | | |
|---|---|---|---|---|
| 4,237,692 A | * | 12/1980 | Ahrens et al. ................... | 60/659 |
| 4,522,024 A | * | 6/1985 | Zaugg .............................. | 60/775 |
| 4,630,436 A | * | 12/1986 | Frutschi ..................... | 60/39.183 |
| 4,765,142 A | * | 8/1988 | Nakhamkin .................... | 60/652 |
| 5,448,889 A | * | 9/1995 | Bronicki .................... | 60/641.14 |
| 5,537,822 A | * | 7/1996 | Shnaid et al. .................... | 60/659 |
| 5,778,675 A | * | 7/1998 | Nakhamkin .................... | 60/652 |
| 7,578,130 B1 | | 8/2009 | Kraemer et al. | |
| 8,011,189 B2 | * | 9/2011 | Nakhamkin .................... | 60/772 |
| 2003/0033809 A1 | * | 2/2003 | Konezciny et al. ............. | 60/772 |
| 2003/0037548 A1 | * | 2/2003 | Gerdes et al. ................... | 60/727 |
| 2003/0131599 A1 | * | 7/2003 | Gerdes ............................. | 60/727 |
| 2006/0213183 A1 | * | 9/2006 | Althaus .......................... | 60/274 |
| 2008/0011161 A1 | | 1/2008 | Finkenrath et al. | |
| 2008/0104938 A1 | | 5/2008 | Finkenrath et al. | |
| 2008/0104958 A1 | | 5/2008 | Finkenrath et al. | |
| 2008/0127632 A1 | | 6/2008 | Finkenrath et al. | |
| 2008/0134660 A1 | | 6/2008 | Finkenrath et al. | |
| 2009/0178384 A1 | * | 7/2009 | Nakhamkin ............... | 60/39.183 |

* cited by examiner

*Primary Examiner* — Phutthiwat Wongwian
(74) *Attorney, Agent, or Firm* — Andrew J. Caruso (57) ABSTRACT

A power generation system includes a first compressor, a second compressor, a combustor configured to receive compressed air from the second compressor to produce an exhaust stream, a first turbine, and a power turbine. The first turbine is configured to receive the exhaust stream, generate a rotational power from the exhaust stream, output the rotational power to a second compressor, and output the exhaust stream. The system includes a coupling device configured to couple and decouple the first compressor to/from a second turbine, an electrical generator coupled to an output of the power turbine and configured to output electrical power, and a controller configured to cause the coupling device to mechanically decouple the second turbine from the first compressor, and cause the coupling device to direct compressed air from an air storage cavern to an inlet of the second compressor.

21 Claims, 4 Drawing Sheets

SYSTEM AND METHOD OF USING A COMPRESSED AIR STORAGE SYSTEM WITH A GAS TURBINE

BACKGROUND OF THE INVENTION

Embodiments of the invention relate generally to compressed air storage systems and, more particularly, to a system and method of using a compressed air storage system with a gas turbine.

Types of compressed air energy storage systems include diabatic compressed air energy storage (diabatic-CAES) systems and adiabatic compressed air energy storage (ACAES) systems. Such systems typically include a compression train having one or more compressors that operate during a compression stage to compress intake air to 80 bars or more, where the energy stored is available to later power a turbine to generate electricity. Typically, the compressed air can be stored in several types of underground media that include but are not limited to porous rock formations, depleted natural gas/oil fields, and caverns in salt or rock formations. Alternatively, the compressed air can be stored in above-ground systems such as, for example, high pressure pipelines similar to that used for conveying natural gas. However, above-ground systems tend to be expensive and typically do not have a storage capacity comparable to an underground cavern—though they can be attractive in that they can be sited in areas where underground formations are not available.

A diabatic-CAES system typically loses a heat of compression of the air to an ambient environment, while an adiabatic system stores the heat of compression for later use. During operation of the compression stage, compressed air typically exits the compressor having an elevated temperature of, for instance, between 550° C. and 650° C., which is due in large part to heat of compression of the air. The amount of energy contained therein is a function of at least its temperature difference with ambient, its pressure (i.e., a total mass of air), and its heat capacity. Thus, in a diabatic-CAES system, although the heat of compression may be largely present when entering the cavern, its energetic value and availability is diminished as it mixes with the cavern air and as it further cools to surrounding or ambient temperature during storage—leading to a low overall efficiency.

ACAES systems, on the other hand, improve system efficiency by capturing and storing the heat of compression for later use. In such a system, a thermal energy storage (TES) unit is positioned between the compressor and the cavern. Typically, a TES includes a medium for heat storage, and hot air from the compression stage is passed therethrough, transferring its heat of compression to the medium in the process. Some systems include air that exits the TES at or near ambient temperature, thus the TES is able to store heat that is due to compression, as compared to a diabatic system. As such, the air may enter the cavern at or near ambient temperature but at high pressure, and little energy is lost due to any temperature difference between the compressed air and ambient temperature. In order to store the large amounts of energy from the heat of compression, the medium of the TES typically includes a high heat capacity material. For instance, a TES may include concrete, stone, a fluid such as oil, a molten salt, or a phase-change material. The energy stored in the TES is then available to heat the stored high-pressure air as it is drawn therefrom during an energy generation cycle. Thus, ACAES systems provide improved efficiency over diabatic systems, some systems reaching to 75% first law efficiency or greater.

However, overall system efficiency is not necessarily the guiding parameter for determining whether to build or operate a compressed air energy storage system. System efficiency is an important consideration, but there are other factors to be considered, as well. For instance, compressed air storage systems typically derive power from the electric grid during, for instance, relatively less-expensive, off-peak, or low-demand hours such as at night. Alternatively, energy storage operation may derive power from renewable sources such as wind, which may provide intermittent power that may be during less desirable low-demand evening or nighttime hours. The compressed air is then later available to drive one or more turbines to produce electrical energy during an energy generation stage, which may be during peak-power needs. As such, compressed air energy storage systems enable electricity suppliers to store relatively low-cost energy that may then be produced during peak demand periods, which may be sold at a premium. And, another factor to consider in whether to build a compressed air energy storage system is capital expenditure. Because of an increased power surge capability provided by such a compressed air storage system, that capability may obviate the need to build additional and expensive conventional power generation capacity such as natural gas or coal-fired power plants.

Thus, the decision whether to build a compressed air energy storage system is influenced by many factors, that include but are not limited to cost of system operation, availability of renewable energy sources, total power capacity in a given market and price swings between low-demand and high-demand periods, and compressed air energy storage system efficiency. However, construction of such standalone compressed air energy storage systems itself typically includes an initial capital expenditure that may not be justified, despite the ability to collect and store low-cost energy and sell the stored energy during times of peak demand. Thus, in some markets where there is a need for power surge capability, where there is surplus evening capacity, or where renewable energy sources are available, power producers may nevertheless elect not to build such a system because the initial costs of construction are too high.

Gas turbines typically include one or more air compressors coupled together and configured to output compressed air to a combustor. The combustor is typically powered by natural gas and combusts the natural gas therein by using the compressed air from the one or more air compressors. A first turbine is powered by exhaust products of the combustor, and the first turbine is typically mechanically coupled to the one or more compressors to provide mechanical power thereto. The exhaust products exit the first turbine and power a second, or power turbine, which is itself typically coupled to a generator to produce electricity. As such, the combustor provides power to the first turbine, powering the one or more compressors, and the combustor also provides power to the second or power turbine to generate electrical power therefrom.

However, such systems cannot typically benefit from or consume renewable energy resources and do not typically have an energy storage capability, aside from their primary power supply of natural gas. Thus, to meet total power capacity demands of a given area or market, and because of the aforementioned high cost of constructing a compressed air energy storage system, power providers may elect to construct power systems that are based only on natural gas-powered systems. This election precludes power providers from obtaining the benefit of energy storage and from obtaining the benefit of renewable energy systems such as wind power. As such, in markets where renewable energy sources may be readily available, or where evening power may be significantly less expensive to produce than peak power, power providers may nevertheless elect to avoid an initial cost of construction and construct only a natural gas powered turbine system for electrical power generation. Thus, because of initial high cost of construction, power providers may be failing to take advantage of a renewable source that is readily available.

Therefore, it would be desirable to design an apparatus and develop a method of construction that reduces an initial cost of system construction that overcomes the aforementioned drawbacks.

BRIEF DESCRIPTION OF THE INVENTION

Embodiments of the invention provide a system and method of using a compressed air energy storage system with a gas turbine.

In accordance with one aspect of the invention a power generation system includes a first compressor configured to compress air to a first pressure via a first rotational power, a second compressor configured to compress air to a second pressure via a second rotational power, wherein the second pressure is greater than the first pressure, a combustor configured to receive the compressed air from the second compressor and combust a flammable fluid therewith to produce an exhaust stream, and a first turbine. The first turbine is configured to receive the exhaust stream from the combustor, generate the second rotational power from the exhaust stream, output the second rotational power to the second compressor, and output the exhaust stream. The system includes a power turbine configured to receive the exhaust stream from the first turbine, and generate a third rotational power therefrom. The system includes a coupling device configured to couple the first compressor to a second turbine and to decouple the first compressor from the second turbine, an electrical generator coupled to an output of the power turbine and configured to output a first electrical power from the third rotational power, and a controller configured to cause the coupling device to mechanically decouple the second turbine from the first compressor in a first operating mode, and cause the coupling device to direct compressed air from an air storage cavern to an inlet of the second compressor during the first operating mode.

In accordance with another aspect of the invention a method of operating a power generation system, the method includes combusting one of a first stream of air and a second stream of air with fuel in a combustor to generate exhaust products, coupling a first compressor to a second turbine, and while the first compressor is coupled to the second turbine, rotating the first compressor and the second turbine using power from the exhaust products, providing the first stream of air that is compressed in the first compressor to an inlet of the second compressor, pressurizing the first stream of air in the second compressor, and generating electricity using the exhaust products that are generated from the combustion using the first stream of air. The method includes decoupling the first compressor from the second compressor, and while the first compressor is decoupled from the second compressor, extracting a second stream of air from an air storage cavern, providing the second stream of air to the inlet of the of the second compressor, pressurizing the second stream of air in the second compressor, and generating electricity using the exhaust products that are generated from the combustion using the second stream of air.

In accordance with yet another aspect of the invention a controller is configured to cause a coupling device to mechanically couple a first compressor to a second turbine, and while the first compressor and the second turbine are coupled, direct a first airstream from an outlet of the first compressor to an inlet of the second compressor, direct the first airstream from the second compressor to a combustor to generate an exhaust stream, and direct the exhaust stream to a power turbine to generate electricity therefrom. The controller is configured to cause the coupling device to mechanically decouple the first compressor from the second turbine, and while the first compressor and the second turbine are decoupled, direct a second airstream from the outlet of the first compressor to an air storage volume.

In accordance with another aspect of the invention, a method of modifying a gas turbine includes installing a clutch mechanism between a low pressure compressor of the gas turbine and a rotatable turbine of the gas turbine to enable the low pressure compressor to operate with power from a motor to provide pressurized air to an air storage cavern.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

According to embodiments of the invention, a system and a method of operating the system are provided that stores energy from a first compressor in a cavern and directs compressed air from the first compressor to a second compressor in a natural gas-fired turbine system for producing electrical energy. The system and method of operating the system further include modifying a natural gas fired turbine to enable using a compressor in the turbine to compress air alternately for powering the turbine and for storage in an air cavern.

Figure 1:
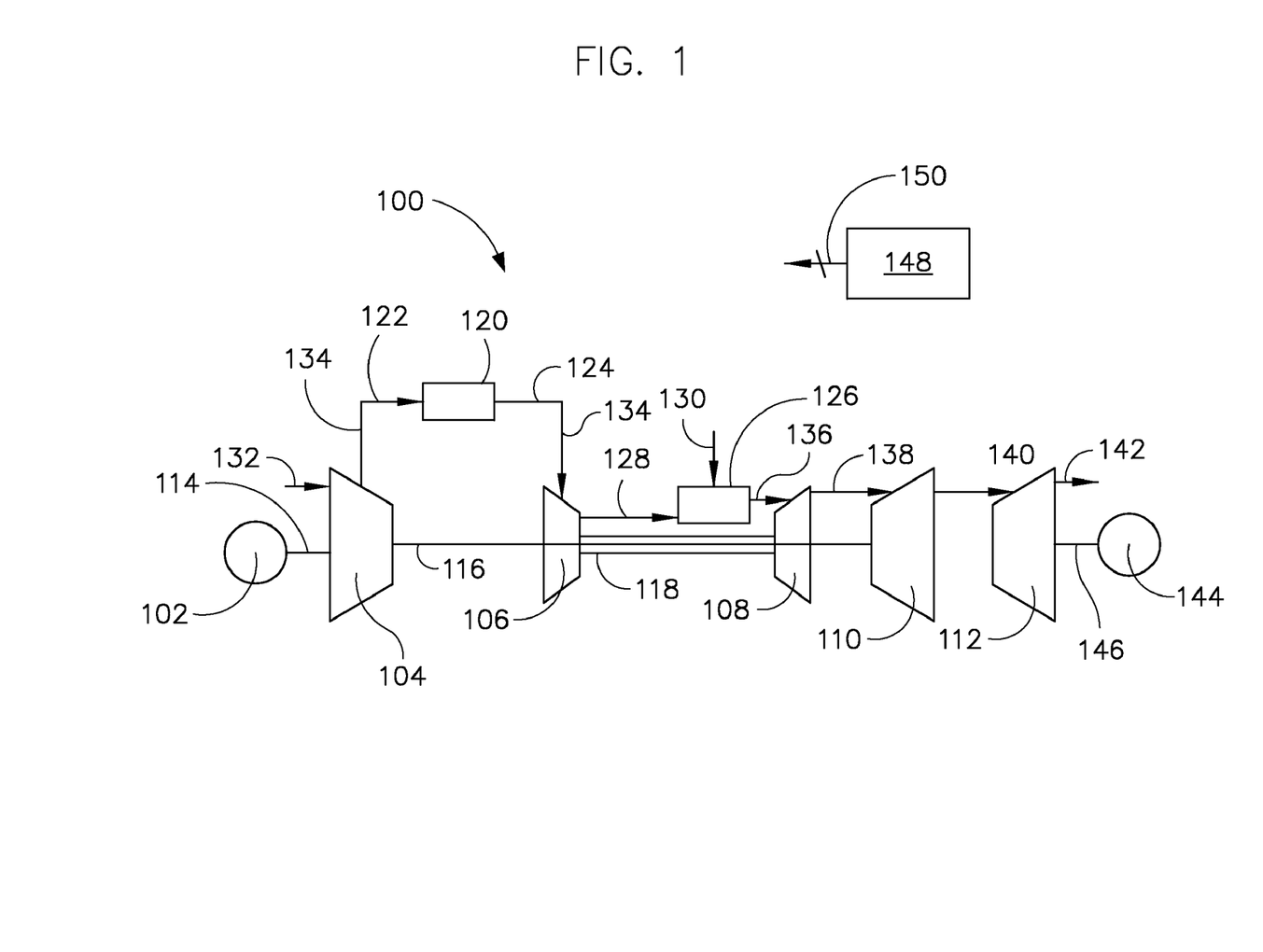
FIG. 1 illustrates a natural gas turbine system for electrical power generation.

FIG. 1 illustrates components of a typical natural gas turbine 100 that may incorporate embodiments of the invention, or that may be modified according to embodiments of the invention. Gas turbine 100 includes a first motor/generator 102 coupled to a first compressor 104, a second compressor 106, a first turbine 108, a second turbine 110, and a power turbine 112. First motor/generator 102 is coupled to first compressor 104 via a shaft 114, and may be decoupled from the first compressor 104, as understood in the art. First compressor 104 is coupled to second turbine 110 via a shaft 116, and second compressor 106 is coupled to first turbine 108 via a shaft 118. An intercooler 120 is coupled to first compressor 104 via a line 122 and to second compressor 106 via a line 124 and is configured to receive compressed air from first compressor 104. Intercooler 120 is configured to cool compressed air from first compressor 104 via, for instance, a liquid coolant (not shown) passing therethrough. A combustor 126 is positioned to receive inlet air from an inlet line 128 and fuel from a fuel line 130. Gas turbine 100 includes an air inlet line 132 and a transfer line 134 which includes lines 122, 124 to pass air from first compressor 104 to second compressor 106.

Gas turbine 100 also includes a first exhaust transfer line 136 coupled between combustor 126 and first turbine 108, a second exhaust transfer line 138 coupled between first turbine 108 and second turbine 110, a transfer line 140 coupled between second turbine 110 and power turbine 112, and an exhaust line 142 coupled to power turbine 112. A motor/generator 144 is coupled to an output shaft 146 of second turbine 110. A controller 148 is coupled to gas turbine 100 via a plurality of control lines 150 and is configured to operate and control gas turbine 100 as understood within the art. First turbine 108 is coupled to second compressor 106 via shaft 118 to provide rotational power thereto, and second turbine 110 is coupled to first compressor 104 via shaft 116 to provide rotational power thereto, as understood within the art.

In operation, first motor/generator 102 causes first compressor 104 to spin via shaft 114 and to compress air that passes thereto via air inlet line 132. Compressed air is transferred therefrom to second compressor 106 via transfer line 134 where the air is further compressed after being cooled in intercooler 120. The further compressed air is passed via inlet line 128 to combustor 126, which mixes the further compressed air therein with fuel that is passed thereto via fuel line 130. After combustion in combustor 126, exhaust products emit therefrom and pass to first turbine 108 via exhaust transfer line 136, and then to second turbine 110 via transfer line 138. As such, first turbine 108 is caused to rotate, thus passing rotational power to second compressor 106 via shaft 118, and second turbine 110 is caused to rotate, thus passing rotational power to first compressor 104 via common shaft 116. As such, first motor/generator 102 may be decoupled from first compressor 104, via a clutch or other such device (not shown) as known in the art, and rotational power may subsequently be provided to first compressor 104 and second compressor 106 via, respectively, second turbine 110 and first turbine 108 to sustain operation of gas turbine 100. Exhaust products exhaust from first turbine 108 through second exhaust transfer line 138, pass to power turbine 112 via transfer line 140, and exhaust to the environment via exhaust line 142. Power turbine 112, in receiving exhaust products from transfer line 140, is caused to rotate and output rotational power to motor/generator 144 via output shaft 146. As stated, control of gas turbine 100 may be affected by controller 148. And, although two compressors 104, 106 and two turbines 108, 110 are illustrated in gas turbine 100 of FIG. 1, it is to be recognized that additional compressors in series, each stepping up air compression in stages, and additional turbines in series may be included, according to embodiments of the invention.

Figure 2:
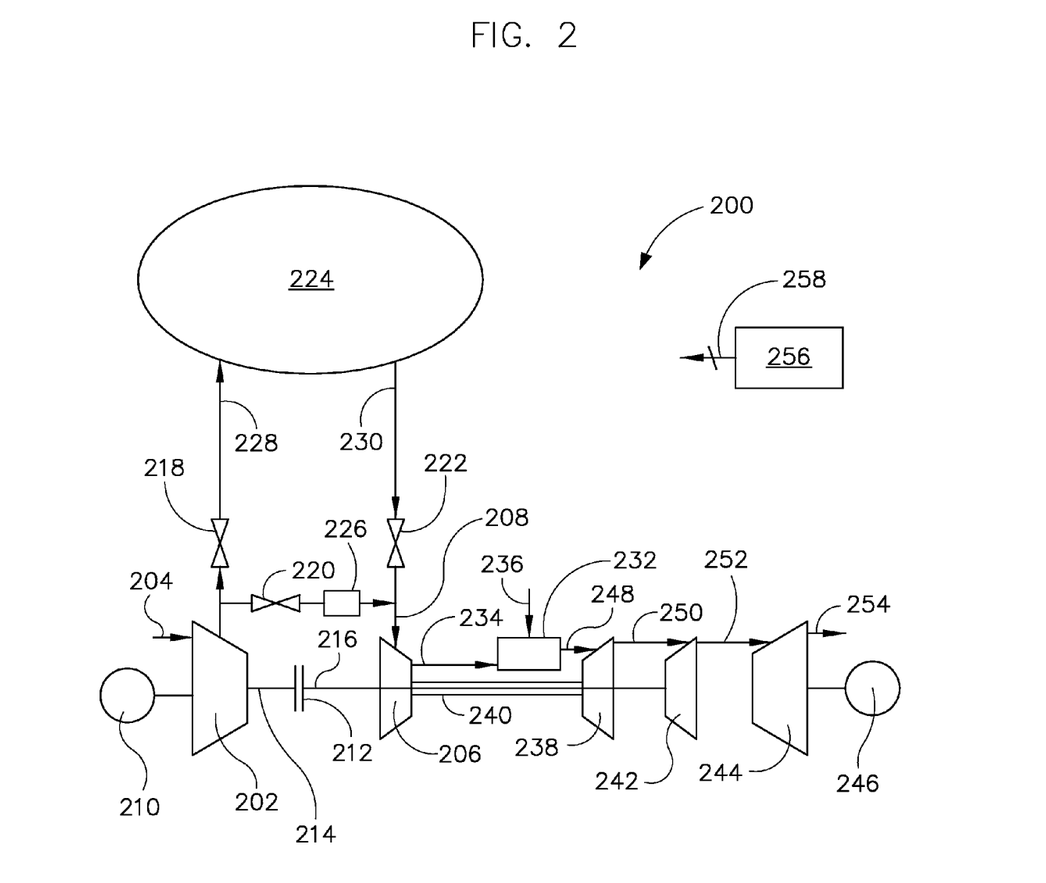
FIG. 2 illustrates a natural gas turbine system according to embodiments of the invention.

FIG. 2 illustrates a system 200 having components of a gas turbine that provide a function that is similar to components of system 100 illustrated in FIG. 1. System 200 includes capability of providing compressed air storage, according to an embodiment of the invention, and includes a first compressor 202 configured to receive an inlet air 204 and pressurize the inlet air 204 to a first pressure. A second compressor 206 is configured to pressurize air passing through an air inlet 208 to a second pressure that is greater than the first pressure. First compressor 202 is coupled to and may be decoupled from an electrical power source 210 that may be an electrical power grid or another power source such as from a renewable or intermittent energy supply such as a wind turbine.

In addition to the components described above, system 200 includes a clutch 212 positioned between a shaft 214 of first compressor 202 and a shaft 216. System 200 includes a first valve 218, a second valve 220, a third valve 222, and an air storage compartment or cavern 224. An intercooler 226 is coupled between first compressor 202 and second compressor 206. An air cavern inlet line 228 and an air cavern outlet line 230 are positioned to respectively pass air from first compressor 202 and to second compressor 206. In one example, air cavern 224 includes a man-made solution-mined salt cavern of approximately 19.6 million cubic feet and operates between 680 psi and 1280 psi, and is capable of providing power for a continuous time duration of 26 hours. Below 680 psi, in this example, the cavern is considered depleted and in need of further charging. However, one skilled in the art will recognize that other systems may yet derive beneficial use from a cavern having air that is at a pressure less than 680 psi. In another example, air cavern 224 includes an above-ground system such as, for example, a high pressure pipeline that is capable of conveying natural gas but used, in this embodiment, for the purpose of storing high-pressure air.

System 200 includes a combustor 232 positioned to receive pressurized air through a combustor inlet 234 from second compressor 206. Combustor 232 includes a fuel inlet line 236 to provide fuel such as natural gas to combustor 232. System 200 includes a first turbine 238 coupled to second compressor 206 via a shaft 240, and a second turbine 242 couplable to first compressor 202 via shaft 216 and via clutch 212. Combustor 232 is configured to receive compressed air from second compressor 206 via line 234. A power turbine 244 is coupled to a first generator/motor 246. First turbine 238 includes an inlet or conveyance line 248 that is configured to pass exhaust products from combustor 232 to first turbine 238. System 200 also includes an inlet or conveyance line 250 that is configured to pass exhaust products from first turbine 238 to second turbine 242, and exhaust products emit or exhaust from second turbine 242 to power turbine 244 in an exhaust line 252. Exhaust products exhaust from power turbine 244 via an exhaust line 254. First turbine 238 is coupled to second compressor 206 to provide rotational power thereto during operation of system 200, as understood within the art.

System 200 has a controller 256 coupled thereto via a plurality of control lines 258 configured to operate system components such as those described above associated with system 200 to control operation thereof. Thus, system 200 is able to selectively direct compressed air from first compressor 202 to air cavern 224, from first compressor 202 to second compressor 206, or from air cavern 224 to second compressor 206 via valves 218-222, according to embodiments of the invention. Operation of valves 218-222 is also performed in conjunction with clutch 212, and such operation is controlled by controller 256. As such, in operation, system 200 may be configured to operate in a charging mode or a discharging mode of air cavern 224, or system 200 may be configured to bypass air cavern 224 altogether.

According to a charging mode of operation, system 200 may be operated to charge or pressurize air cavern 224. According to this mode, controller 256 causes first valve 218 on the air cavern inlet line 228 to open and allow passage of air therethrough, and controller 256 causes valves 220 and 222 to close. Further, in this mode of operation, controller 256 causes clutch 212 to open such that first compressor 202 is mechanically decoupled from second turbine 242. Power may be drawn to first compressor 202 from electrical power source 210 in order to charge or pressurize air cavern 224 via air from inlet air 204. As such, with clutch 212 open, first valve 218 open, and valves 220, 222 closed, system 200 is able to charge air cavern 224 from the electrical power grid during periods of excess electrical power that may occur during evening or nighttime hours, for example, or from a renewable energy source.

According to a discharging mode of operation, controller 256 of system 200 causes clutch 212 to open such that first compressor 202 is mechanically decoupled from second turbine 242. According to this mode, controller 256 causes valves 218 and 220 to close, and causes valve 222 on the air cavern outlet line 230 to open. Compressed air is discharged or drawn from air cavern 224, compressed by second compressor 206, and passed to combustor 232 via combustor inlet 234. The compressed air passing through combustor inlet 234 may be combined with fuel from fuel inlet line 236 for combustion in combustor 232, and exhaust products may be passed from combustor 232 to first turbine 238 via inlet or inlet or conveyance line 248. The exhaust products are next passed through inlet or conveyance line 250 to second turbine 242 and are exhausted through exhaust line 252 to power turbine 244. In this mode of operation, because second turbine 242 is decoupled from first compressor 202, second turbine 242 spins freely and exhaust products pass therefrom. However, in embodiments of the invention, second turbine 242 may be coupled to, for instance, power turbine 244 to augment power to first generator/motor 246, or second turbine 242 may be coupled to electrical power source 210 so that electrical power source 210 may be caused to operate as a generator for generating electrical power therefrom. The exhaust products, in passing through power turbine 244, cause operation thereof, which is conveyed as power to first generator/motor 246. As such, energy stored in air cavern 224 is available to operate system 200. Accordingly, energy that is available during, for instance, evening hours or from intermittent or renewable sources may be stored in air cavern 224 and drawn later during operation of combustor 232 to ultimately power turbine 244 and generate electrical power via first generator/motor 246. Thus, relatively less expensive power may be used to store energy for later use to generate electrical power during high-demand, during periods when capacity limits have been reached, or during periods when a premium may be charged for electrical power.

According to yet another mode of operation, pressurized air from air cavern 224 may be used to augment power production. In this mode of operation, air may be pressurized in first compressor 202 and supplied to second compressor 206 while pressurized air from air cavern 224 is being simultaneously drawn and supplied to second compressor 206. For this mode, controller 256 causes first valve 218 to close, causes valves 220 on an air cavern bypass line, 222 on the air cavern outlet line to open, and causes clutch 212 to close— thus mechanically coupling first compressor 202 to second compressor 206. Such operation may be desirable when, for instance, air cavern 224 is partially depleted of air pressure but still retains adequate air pressure to provide pressurized air to second compressor 206. Thus, air may be directed to second compressor 206 from both air cavern 224 and from first compressor 202 to provide continuous and sustained operation, and such operation may continue until air cavern 224 is partially or fully depleted. When air cavern 224 is partially or fully depleted or when the air pressure of air cavern 224 is below the air pressure supplied by first compressor 202, third valve 222 may be closed by controller 256, and system 200 operation may proceed having air provided by first compressor 202 only.

Thus, system 200 may be caused to operate in a number of modes that may take advantage of intermittent power supplies or that may take advantage of low-cost electrical power that may be available during off-hours to be stored for later usage during, for instance, peak power demand. System 200 may likewise take advantage of stored energy in air cavern 224 to augment energy production, to increase system efficiency, or to enhance peak power output capabilities thereof. One embodiment of the invention includes modifying an existing gas turbine, such as gas turbine 100 illustrated in FIG. 1, to include functionality as described.

Figure 3:
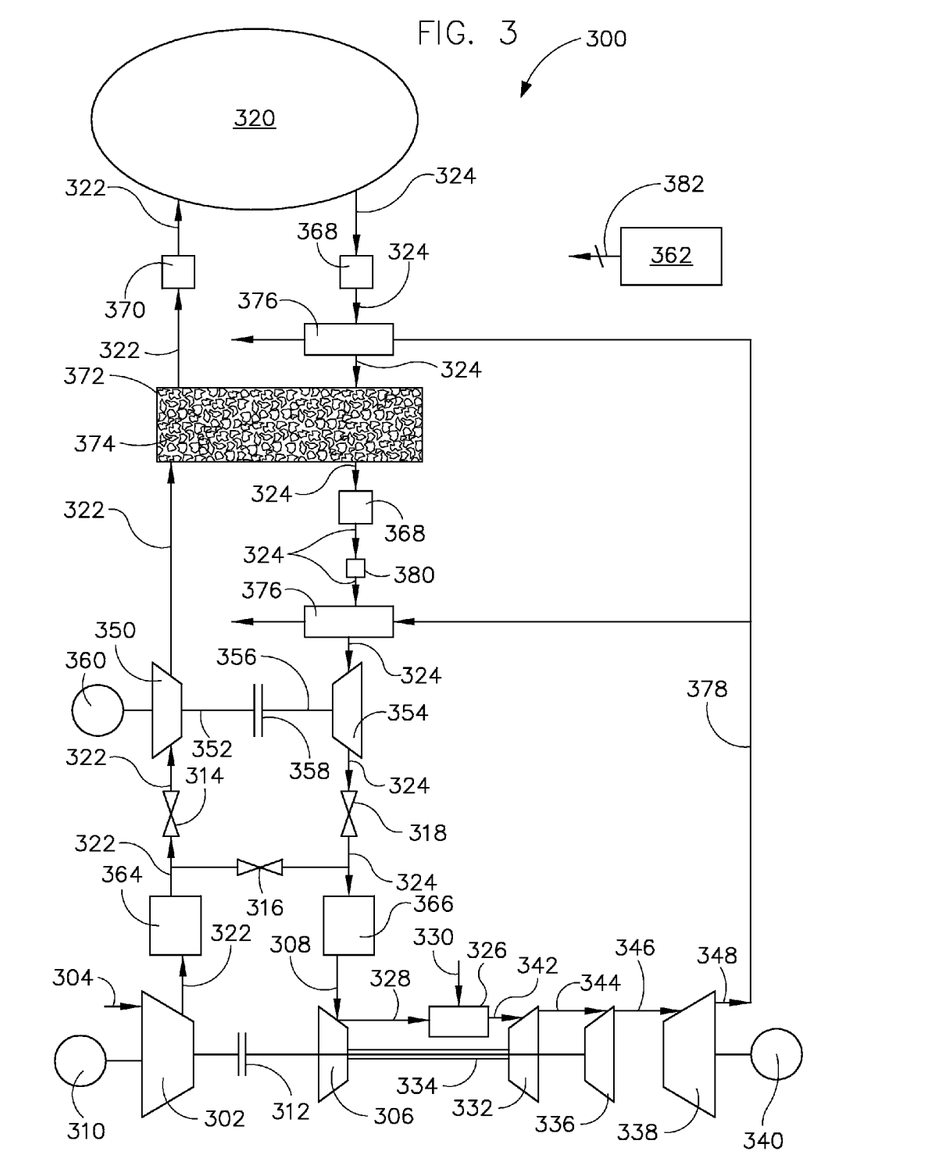
FIG. 3 illustrates a natural gas turbine system according to embodiments of the invention.

FIG. 3 illustrates a gas turbine with air storage system 300 according to an embodiment of the invention. System 300 includes operation according to the modes described with respect to system 200 as illustrated in FIG. 2. System 300 includes additional components, as well, and additional system functionality as will be described.

System 300 includes a first compressor 302 configured to receive an inlet air 304 and pressurize the inlet air 304 to a first pressure. A second compressor 306 is configured to pressurize air passing through an air inlet 308 to a second pressure that is greater than the first pressure. First compressor 302 is coupled to an electrical power source 310 that may be an electrical power grid or another power source such as from a renewable or intermittent energy supply such as a wind turbine. System 300 includes a clutch 312. System 300 includes a first valve 314, a second valve 316, a third valve 318, and an air cavern 320. In one example, air cavern 320 includes a man-made solution-mined salt cavern of approximately 19.6 million cubic feet and operates between 680 psi and 1280 psi, and is capable of providing power for a continuous time duration of 26 hours. In another example, air cavern 320 includes an above-ground system such as, for example, a high pressure pipeline that is used for conveying natural gas. An air cavern conveyance or inlet line 322 and an air cavern conveyance or outlet line 324 are positioned to respectively pass air from first compressor 302 and to second compressor 306.

System 300 includes a combustor 326 positioned to receive pressurized air through a combustor inlet 328 from second compressor 306. Combustor 326 includes a fuel inlet line 330 to provide fuel such as natural gas to combustor 326. System 300 includes a first turbine 332 coupled to second compressor 306 via a shaft 334, a second turbine 336 couplable to first compressor 302 via clutch 312, and a power turbine 338 coupled to a first generator/motor 340. Combustor 326 includes a conveyance line 342 to convey exhaust or combustion products from combustor 326 to first turbine 332. Second turbine 336 includes an inlet or conveyance line 344 that is configured to pass exhaust products from first turbine 332 to second turbine 336. System 300 also includes an inlet or conveyance line 346 that is configured to pass exhaust products from second turbine 336 to power turbine 338, and exhaust products emit or exhaust from power turbine 338 in an exhaust line 348. First turbine 332 is coupled to second compressor 306 to provide rotational power thereto during operation, as is understood in the art, and first compressor 302 is couplable to and decouplable from second turbine 336 via clutch 312.

System 300 includes a third compressor 350 coupled to a shaft 352 and a third turbine 354 coupled to a shaft 356 in order to expand air from air cavern 320 to a pressure, such as 3-5 bars, which is an inlet pressure level desired, in this example, for operation of second compressor 306. Shafts 352, 356 are couplable to one another via a clutch 358 to enable power generation via third turbine 354, which is coupled to a motor/generator 360 through third compressor 350. As such, system 300 includes modes of operation that include further compressing air that passes from first compressor 302 before entering air cavern 320. Accordingly, compressor 350, which in one embodiment is powered by first motor/generator 360 and controlled by a controller 362, compresses air passing therethrough to an additional, stepped up pressure such as 60-80 bars or more, to enable additional storage capacity of air cavern 320. As such, because first compressor 302 is typically a low pressure compressor that may output air at 3-5 bars, as an example, third compressor 350 provides an additional ability to further improve system storage because of the additional pressure capability provided by third compressor 350. Additionally, clutch 358 may be used to couple third turbine 354 to third compressor 350 in order that power derived from air cavern 320, when passing through third turbine 354, may be used to drive shaft 352, thereby producing electrical power via first motor/generator 360.

An optional intercooler 364 is positioned proximately to first compressor 302 and configured to receive compressed air therefrom, and an optional aftercooler 366 is positioned proximately to second compressor 306 and is configured to pass compressed air thereto. Optional intercooler 364 and optional aftercooler 366 are respectively positioned to cool compressed air passing therethrough and provide additional temperature control capability to limit temperatures, improve efficiency, and the like, as understood in the art. System 300 also includes an optional pair of pre-treatment filters 368 and an optional aftercooler 370 positioned to further control and condition air temperature and particulate quality as the compressed air passes to and from air cavern 320.

System 300 optionally includes a thermal energy storage (TES) 372 system that passes air therethrough to and from air cavern 320. In embodiments of the invention, TES 372 includes a medium 374 for heat storage such as concrete, stone, a fluid such as oil, a molten salt, or a phase-change material, as examples. Air heated from compression is passed through medium 374, thereby transferring heat from its heat of compression to medium 374 in the process. As such and as understood in the art, TES 372 provides a capability to improve overall efficiency of system 300 by extracting and storing thermal energy from air passing to air cavern 320 and by releasing thermal energy into air passing from air cavern 320. System 300 optionally includes one or more heat exchangers 376 coupled to exhaust line 348 and coupled to air cavern outlet line 324 to allow some recovery of waste heat from exhaust line 348 to further heat air passing through air cavern outlet line 324 such that overall efficiency of system 300 may be increased. Heat exchangers 376 are coupled to exhaust line 348 via an exhaust conveyance line 378. Thus, heat exchangers 376 provide an additional capability to recover waste heat from exhaust products exiting from second turbine 338. In one embodiment a combustor 380 is included to augment or further heat passing from air cavern 320.

System 300 includes controller 362 coupled thereto via a plurality of control lines 382 configured to operate system components such as those described above with respect to system 300 to control operation thereof. Thus, system 300 is configured to selectively direct compressed air from first compressor 302 to air cavern 320, from first compressor 302 to second compressor 306, or from air cavern 320 to second compressor 306 via valves 314-318 according to embodiments of the invention. Operation of valves 314-318 is also performed in conjunction with clutch 312, and such operation is controlled by controller 362. As such, in operation, system 300 may be configured to operate in a charging mode or a discharging mode of air cavern 320, or system 300 may be configured to bypass air cavern 320 altogether. One skilled in the art will recognize that, though illustrated with respect to system 300 of FIG. 3, optional components such as components 350, 354, and 364-376 may be used in other embodiments of the invention as described in FIGS. 1 and 2 above, and FIG. 4 below.

Figure 4:
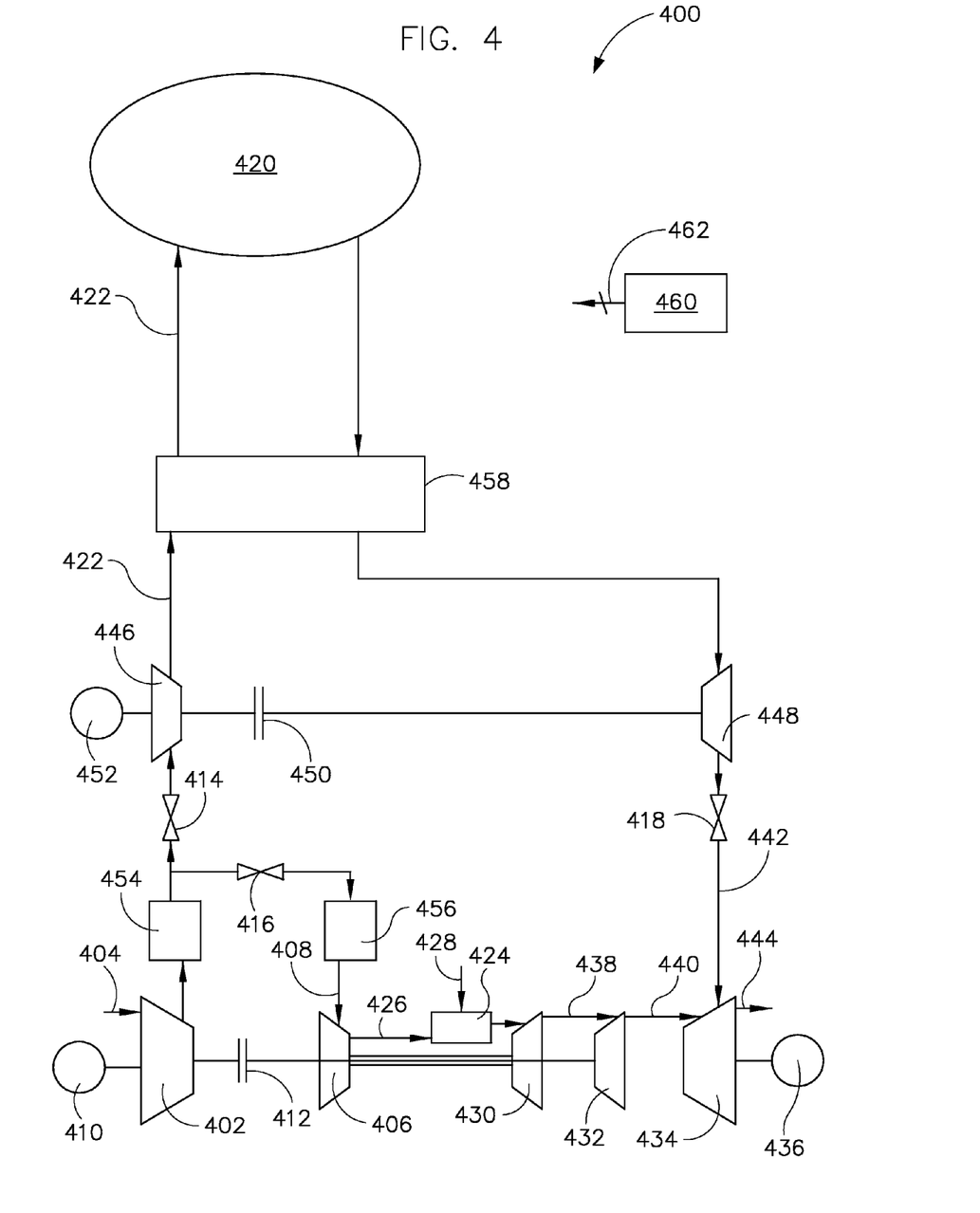
FIG. 4 illustrates a natural gas turbine system according to embodiments of the invention.

FIG. 4 illustrates a system 400 that includes a gas turbine and additional components according to embodiments of the invention. System 400 includes a first compressor 402 configured to receive an inlet air 404 and pressurize the inlet air 404 to a first pressure, and a second compressor 406 configured to pressurize air passing through an air inlet 408 to a second pressure that is greater than the first pressure. First compressor 402 is coupled to an electrical power source 410 that may be an electrical power grid, or may be another power source such as from a renewable or intermittent energy supply such as a wind turbine.

System 400 includes a clutch 412 coupled to first compressor 402. System 400 includes a first valve 414, a second valve 416, a third valve 418, and an air cavern 420. In one example, air cavern 420 includes a man-made solution-mined salt cavern of approximately 19.6 million cubic feet and operates between 680 psi and 1280 psi, and is capable of providing power for a continuous time duration of 26 hours. In another example, air cavern 420 includes an above-ground system such as, for example, a high pressure pipeline that is used for conveying natural gas. An air cavern inlet line 422 is positioned to pass air from first compressor 402 thereto.

System 400 includes a combustor 424 positioned to receive pressurized air through a combustor inlet 426 from second compressor 406. Combustor 424 includes a fuel inlet line 428 to provide fuel such as natural gas to combustor 424. System 400 includes a first turbine 430 coupled to second compressor 406, a second turbine 432 couplable to first compressor 402 via clutch 412, and a power turbine 434 coupled to a first generator/motor 436. First turbine 430 is configured to receive exhaust products from combustor 424, and second turbine 432 includes an inlet or conveyance line 438 that is configured to pass exhaust products from first turbine 430 to second turbine 432. System 400 also includes an inlet or conveyance line 440 that is configured to pass exhaust products from second turbine 432 to power turbine 434, and another inlet or conveyance line 442 configured to pass pressurized air from air cavern 420 to power turbine 434. Exhaust products emit or exhaust therefrom in an exhaust line 444. First turbine 430 is coupled to second compressor 406 to provide rotational power thereto, as is understood in the art.

System 400 includes a third compressor 446 and a third turbine 448 coupled to one another via a clutch 450. A motor/generator 452 is coupled to third compressor 446. An optional intercooler 454 is positioned proximate first compressor 402 and configured to receive compressed air therefrom, and an optional aftercooler 456 is positioned proximate second compressor 406 and is configured to pass compressed air thereto. Optional intercooler 454 and optional aftercooler 456 are respectively positioned to cool compressed air passing therethrough and provide additional temperature control capability to limit temperatures, improve efficiency, and the like, as understood in the art.

System 400 optionally includes a thermal energy storage (TES) 458 system that passes air therethrough to and from air cavern 420. In embodiments of the invention, TES 458 includes a medium for heat storage such as concrete, stone, a fluid such as oil, a molten salt, and a phase-change material, as examples. Air heated from compression is passed therethrough, thereby transferring its heat of compression to the medium in the process. As such and as understood in the art, TES 458 provides a capability to improve overall efficiency of system 400, in its ability to extract and store energy as it passes respectively to and from air cavern 420.

System 400 includes a controller 460 coupled thereto via a plurality of control lines 462 configured to operate system components such as those described above associated with system 400 to control operation thereof. System 400 is configured to selectively direct compressed air from first compressor 402 to air cavern 420, from first compressor 402 to second compressor 406, or from air cavern 420 to second turbine 434, via valves 414-418, according to embodiments of the invention. Operation of valves 414-418 is also in conjunction with clutch 412, and such operation is controlled by controller 460. As such, in operation, system 400 may be configured to operate in a charging mode or a discharging mode of air cavern 420, or system 400 may be configured to bypass air cavern 420 altogether.

Gas turbines accepting inlet air at or near elevated ambient temperatures will have a negative impact on total output, as the density of the combustion air entering the combustor after compression will be less than the density of combustion air when ambient temperatures are lower. Optimum inlet air temperatures typically vary from gas turbine to gas turbine, and, for individual gas turbines, optimum inlet air temperatures can be influenced by such factors as site altitude. For a given site, however, ambient temperatures above the optimum inlet air temperature typically results in lower output potential. For example, ambient temperatures on the order of 100 degrees Fahrenheit can lead to a power output reduction of 10% or more. Accordingly, an element of the TES includes providing for such temperature measurement and control features so as to provide a temperature for air entering the gas turbine so as to afford maximum output, according to embodiments of the invention. On hot days, therefore, such temperature control capability may include expanding air to decrease or adjust its temperature, enabling the gas turbine to maximize potential power output as if it had benefit of an inlet air chiller, but without the attendant parasitic power losses associated with the operation of such chiller.

A technical contribution for the disclosed method and apparatus is that is provides for a computer implemented compressed air storage system and, more particularly, to a system and method of using a compressed air storage system with a gas turbine.

Therefore, according to one embodiment of the invention a power generation system includes a first compressor configured to compress air to a first pressure via a first rotational power, a second compressor configured to compress air to a second pressure via a second rotational power, wherein the second pressure is greater than the first pressure, a combustor configured to receive the compressed air from the second compressor and combust a flammable fluid therewith to produce an exhaust stream, and a first turbine. The first turbine is configured to receive the exhaust stream from the combustor, generate the second rotational power from the exhaust stream, output the second rotational power to the second compressor, and output the exhaust stream. The system includes a power turbine configured to receive the exhaust stream from the first turbine, and generate a third rotational power therefrom. The system includes a coupling device configured to couple the first compressor to a second turbine and to decouple the first compressor from the second turbine, an electrical generator coupled to an output of the power turbine and configured to output a first electrical power from the third rotational power, and a controller configured to cause the coupling device to mechanically decouple the second turbine from the first compressor in a first operating mode, and cause the coupling device to direct compressed air from an air storage cavern to an inlet of the second compressor during the first operating mode.

According to another embodiment of the invention a method of operating a power generation system, the method includes combusting one of a first stream of air and a second stream of air with fuel in a combustor to generate exhaust products, coupling a first compressor to a second turbine, and while the first compressor is coupled to the second turbine, rotating the first compressor and the second turbine using power from the exhaust products, providing the first stream of air that is compressed in the first compressor to an inlet of the second compressor, pressurizing the first stream of air in the second compressor, and generating electricity using the exhaust products that are generated from the combustion using the first stream of air. The method includes decoupling the first compressor from the second compressor, and while the first compressor is decoupled from the second compressor, extracting a second stream of air from an air storage cavern, providing the second stream of air to the inlet of the of the second compressor, pressurizing the second stream of air in the second compressor, and generating electricity using the exhaust products that are generated from the combustion using the second stream of air.

According to yet another embodiment of the invention, a controller is configured to cause a coupling device to mechanically couple a first compressor to a second turbine, and while the first compressor and the second turbine are coupled, direct a first airstream from an outlet of the first compressor to an inlet of the second compressor, direct the first airstream from the second compressor to a combustor to generate an exhaust stream, and direct the exhaust stream to a power turbine to generate electricity therefrom. The controller is configured to cause the coupling device to mechanically decouple the first compressor from the second turbine, and while the first compressor and the second turbine are decoupled, direct a second airstream from the outlet of the first compressor to an air storage volume.

According to another embodiment of the invention, a method of modifying a gas turbine includes installing a clutch mechanism between a low pressure compressor of the gas turbine and a rotatable turbine of the gas turbine to enable the low pressure compressor to operate with power from a motor to provide pressurized air to an air storage cavern.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power generation system comprising:
   a first compressor configured to compress air to a first pressure via a first rotational power;
   a second compressor configured to compress air to a second pressure via a second rotational power, wherein the second pressure is greater than the first pressure;
   a combustor configured to receive the compressed air from the second compressor and combust a flammable fluid therewith to produce an exhaust stream;
   a first turbine configured to:
     receive the exhaust stream from the combustor;
     generate the second rotational power from the exhaust stream;
     output the second rotational power to the second compressor; and
     output the exhaust stream;
   a power turbine configured to:
     receive the exhaust stream from the first turbine; and
     generate a third rotational power therefrom;

a coupling device configured to couple the first compressor to a second turbine and to decouple the first compressor from the second turbine;

an electrical generator coupled to an output of the power turbine and configured to output a first electrical power from the third rotational power; and a controller configured to:
cause the coupling device to mechanically decouple the second turbine from the first compressor in a first operating mode; and
cause a valve on an air cavern outlet line to open to direct compressed air from an air storage cavern to an inlet of the second compressor during the first operating mode.

2. The system of claim 1 further comprising a heat exchanger configured to extract heat from the exhaust stream to heat the compressed air from the air storage cavern, wherein the power turbine is configured to output the exhaust stream to the heat exchanger.

3. The system of claim 1 wherein the controller is further configured to:
cause the coupling device to mechanically couple the second turbine to the first compressor in a second operating mode to provide the first rotational power to the first compressor from the second turbine; and
cause a valve on an air cavern bypass line to open to direct the compressed air from the first compressor to the inlet of the second compressor during the second operating mode.

4. The system of claim 3 wherein the coupling device is a first clutch coupled between the first compressor and the second turbine, wherein the clutch is controlled by the controller to respectively mechanically couple and decouple the second turbine to and from the first compressor.

5. The system of claim 3 further comprising a first motor mechanically coupled to the first compressor; and wherein, when the second turbine is mechanically decoupled from the first compressor, the controller is configured to:
provide the first rotational power to the first compressor via the first motor to compress air to the first pressure; and
direct the compressed air from the first compressor into the air storage cavern via an air cavern inlet line.

6. The system of claim 5 further comprising:
a second motor; and
a third compressor coupled to the second motor, the third compressor configured to:
draw power from the second motor;
receive the compressed air from the first compressor;
further compress the compressed air to a third pressure that is greater than the first pressure; and
output the further compressed air to the air storage cavern.

7. The system of claim 6 further comprising an intercooler positioned between the first compressor and the third compressor, the intercooler configured to extract heat from the compressed air passing from the first compressor.

8. The system of claim 6 further comprising a third turbine configured to:
receive the further compressed air from the air storage cavern;
expand the received air and generate rotational power therefrom; and
pass the expanded air to the inlet of the second compressor.

9. The system of claim 8 further comprising a second clutch positioned between the third compressor and the third turbine to mechanically couple the third compressor to the third turbine, such that when the rotational power is generated in the third turbine, the rotational power is transmitted to the second motor via the third compressor such that the second motor generates electrical power therefrom.

10. The system of claim 8 further comprising a thermal energy storage (TES) unit positioned to receive the further compressed air from the third compressor prior to the further compressed air being output to the air storage cavern, wherein the TES is configured to extract and store a heat of compression from the further compressed air, and wherein the compressed air exiting from the air storage cavern is passed through the TES to receive the stored heat of compression therefrom.

11. The system of claim 10 wherein the controller is configured to measure a temperature of compressed air exiting the TES and adjust a temperature thereof prior to the air entering the second compressor.

12. A method of operating a power generation system, the method comprising:
combusting one of a first stream of air and a second stream of air with fuel in a combustor to generate exhaust products;
coupling a first compressor to a second turbine, and while the first compressor is coupled to the second turbine:
rotating the first compressor and the second turbine using power from the exhaust products;
coupling a second compressor to a first turbine;
providing the first stream of air that is compressed in the first compressor to an inlet of the second compressor;
pressurizing the first stream of air in the second compressor; and
generating electricity using the exhaust products that are generated from the combustion using the first stream of air; and
decoupling the first compressor from the second turbine, and while the first compressor is decoupled from the second turbine:
extracting a second stream of air from an air storage cavern;
providing the second stream of air to the inlet of the of the second compressor;
pressurizing the second stream of air in the second compressor; and
generating electricity using the exhaust products that are generated from the combustion using the second stream of air.

13. The method of claim 12 wherein the steps of generating electrical power using exhaust products from either the first stream of air or the second stream of air include:
passing one of the first stream of air and the second stream of air from the second compressor to the combustor;
combusting a flammable fluid in the combustor using at least the passed stream of air and the flammable fluid to generate the exhaust products;
generating turbine power in a power turbine from the exhaust products; and
generating the electrical power in a generator that is coupled to the power turbine.

14. The method of claim 12 wherein, when the first compressor is decoupled from the second turbine, the method further comprises:
rotating the first compressor using power from an electrical motor to generate a third stream of air; and
passing the third stream of air to the air storage cavern.

15. The method of claim 14 further comprising rotating a third compressor and passing the third stream of air therethrough prior to passing the third stream of air to the air storage cavern.

16. A controller configured to:
cause a coupling device to mechanically couple a first compressor to a second turbine, and while the first compressor and the second turbine are coupled:
  direct a first airstream from an outlet of the first compressor to an inlet of a second compressor, wherein the second compressor is coupled to a first turbine;
  direct the first airstream from the second compressor to a combustor to generate an exhaust stream; and
  direct the exhaust stream to a power turbine to generate electricity therefrom; and
cause the coupling device to mechanically decouple the first compressor from the second turbine, and while the first compressor and the second turbine are decoupled:
  direct a second airstream from the outlet of the first compressor to an air storage volume.

17. The controller of claim 16 wherein, when the first compressor is mechanically decoupled from the second turbine, the controller is further configured to:
  direct a third airstream from the air storage volume to an expansion turbine;
  extract electrical power from the expansion turbine; and
  direct the third airstream to the combustor.

18. The controller of claim 16 wherein, when the first compressor is mechanically decoupled from the second turbine, the controller is further configured to:
  direct a third airstream from the air storage volume to the second compressor;
  direct the third airstream from the second compressor to the combustor to generate the exhaust stream; and
  direct the exhaust stream to the power turbine to generate the electricity therefrom via a first generator.

19. The controller of claim 18 wherein the controller is further configured to:
  direct the third airstream from the air storage volume to an expansion turbine;
  extract electrical power from the expansion turbine via a second generator; and
  direct the third airstream from the expansion turbine to the second compressor.

20. The controller of claim 19 wherein the controller is configured to direct the exhaust stream from the power turbine to a heat exchanger that is configured to heat the third airstream from the air storage volume prior to the third airstream entering the expansion turbine.

21. The controller of claim 16 wherein, when the first compressor is mechanically decoupled from the second turbine, the controller is further configured to:
  direct the second airstream from the outlet of the first compressor to an inlet of a third compressor; and
  pass the second airstream from the third compressor to the air storage volume.

* * * * *